(12) United States Patent
Marra (10) Patent No.: US 10,054,784 B1
(45) Date of Patent: Aug. 21, 2018

(54) EMULSION DISPENSING METHOD FOR MANUFACTURING AN ELECTROWETTING DEVICE

(71) Applicant: Amazon Technologies, Inc., Seattle, WA (US)

(72) Inventor: Lucia Marra, Eindhoven (NL)

(73) Assignee: Amazon Technologies, Inc., Seattle, WA (US)

(*) Notice: Subject to any disclaimer, the term of this patent is extended or adjusted under 35 U.S.C. 154(b) by 430 days.

(21) Appl. No.: 14/868,260

(22) Filed: Sep. 28, 2015

(51) Int. Cl.
*G02B 26/00* (2006.01)
*G02B 1/10* (2015.01)
*B05C 5/02* (2006.01)
*B05C 9/10* (2006.01)

(52) U.S. Cl.
CPC .......... *G02B 26/005* (2013.01); *B05C 5/0291* (2013.01); *B05C 9/10* (2013.01); *G02B 1/10* (2013.01)

(58) Field of Classification Search
CPC ........................ G02B 26/004; G02B 26/005
See application file for complete search history.

(56) References Cited

U.S. PATENT DOCUMENTS

| | | | | |
|---|---|---|---|---|
| 8,696,847 | B2* | 4/2014 | Schram | G02B 26/004 156/145 |
| 9,651,771 | B2* | 5/2017 | Schram | G02B 26/005 |
| 2011/0195258 | A1 | 8/2011 | Fan et al. | |

FOREIGN PATENT DOCUMENTS

WO    2011135044 A1    11/2011

OTHER PUBLICATIONS

Wang, et al, "On-Chip Double Emulsion Droplet Assembly Using Electrowetting-On-Dielectric and Dielectrophoresis", Fusion Science and Technology, vol. 59, Jan. 2011, pp. 240-249.*
Luo, R. and Chen, C. (Dec. 31, 2012) "Structured Microgels through Microfluidic Assembly and Their Biomedical Applications". Soft, 1, 1-23 Scientific Research http://www.scirp.org/journal/soft/.
Charlot, B., Sanchez, N., Roux, P., Teixiera, S., Double emulsion generation and separation by microfluidic consecutive flow focusing, DTIP, Symposium on Design, Test, Integration and Packaging of MEMS/MOEMS, at Cannes, France, Apr. 1-4, 2014.
Weiqiang Wang "On-Chip Double Emulsion Droplet Assembly Using Electrowetting-on-Dielectric and Dielectrophoresis" Materials Science Program; Arts, Science and Engineering, Edmund A. Hajim School of Engineering and Applied Sciences, University of Rochester, Rochester, New York, Nov. 7, 2012.

* cited by examiner

*Primary Examiner* — Jeffry H Aftergut
(74) *Attorney, Agent, or Firm* — EIP US LLP (57) ABSTRACT

A method of manufacturing an electrowetting device. An emulsion is dispensed on a surface of a first support plate comprising an electrode. The emulsion comprises a first fluid dispersed in a second fluid immiscible with the first fluid, and, dispersed within the first fluid, a third fluid immiscible with the first fluid. The method includes coalescing the first fluid to form a layer of the first fluid on the surface of the first support plate.

25 Claims, 4 Drawing Sheets

FIG. 6

EMULSION DISPENSING METHOD FOR MANUFACTURING AN ELECTROWETTING DEVICE

BACKGROUND

In a known electrowetting device, a first fluid and a second fluid immiscible with the first fluid are confined between a first support plate and a second support plate. A known method of manufacturing such an electrowetting device involves providing the first fluid and the second fluid on the first support plate as an emulsion. The first fluid and the second fluid then separate out to form a layer of the first fluid on the first support plate and a layer of the second fluid on the second support plate. Using such a method, it can be difficult to accurately control the amounts of the fluids.

It is desirable to provide an improved method of manufacture of an electrowetting device.

DETAILED DESCRIPTION

Figure 1:
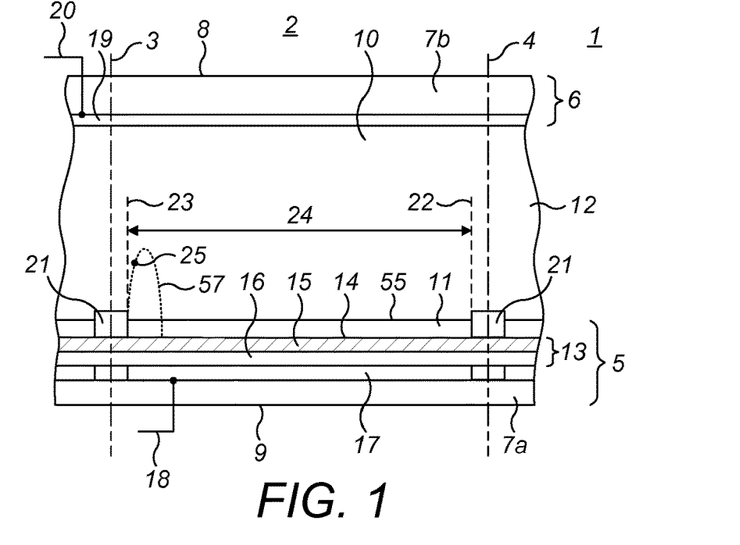
FIG. 1 shows schematically an example electrowetting element.

FIG. 1 shows a diagrammatic cross-section of part of an example of an electrowetting display device 1, including a plurality of picture elements or display elements 2, one of which is shown in the Figure and which may also be referred to as an electrowetting pixel. Such a pixel or display element is an example of an electrowetting cell or an electrowetting element, the pixel or display element being an example of an electrowetting element for providing a display effect. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 7a, 7b and may be rigid or flexible. The support plates in some examples include further layers and/or structures than illustrated, for example circuitry for controlling the display elements. Such features are not illustrated, for clarity.

The display device has a viewing side 8 on which an image or display formed by the display device can be viewed and a rear side 9. In the Figure a surface of the first support plate 5, which surface is in this example a surface of the substrate 7a, defines the rear side 9; a surface of the second support plate 6, which surface is in this example a surface of the substrate 7b, defines the viewing side 8; alternatively, in other examples, a surface of the first support plate may define the viewing side. The display device may be of the reflective, transmissive or transflective type. The display device may be an active matrix driven or a direct drive display device. The plurality of display elements may be monochrome. For a colour display device the display elements may be divided in groups, each group having a different colour; alternatively, an individual display element may be able to show different colours.

A space 10, which may otherwise be considered to be a chamber, of each display element between the support plates is filled with two layers of fluid. In the example of FIG. 1, the space 10 is filled with a first layer 11 of fluid and a second layer 12 of fluid, at least one of which may be a liquid. The fluid of the second layer is substantially immiscible with the fluid of the first layer. Therefore, the first layer and the second layer do not substantially mix with each other and in some examples do not mix with each other to any degree. With the first and second layers substantially not mixing with each other, it is envisaged in some examples that there may be some degree of mixing of the first and second layers, but that this is considered negligible in that the majority of the volume of the first layer is not mixed with the majority of the volume of the second layer. The substantial immiscibility of the first and second layers is due to the properties of the first and second layers, for example their chemical compositions; the first and second layers tend to remain separated from each other, therefore tending not to mix together to form a homogeneous mixture. Due to this immiscibility, the first and second layers meet each other at an interface labelled 55 in FIG. 1 for when no voltage is applied and labelled 57 for when a voltage is applied, which interface defines a boundary between the volume of the fluid of the first layer and the volume of the fluid of the second layer; this interface or boundary may be referred to as a meniscus. The location and shape of the interface between the first layer and the second layer in examples is determined by the applied voltage. The thickness of the first and second layers in FIG. 1 is shown as an example; in other examples, the first and/or second layers may have different thicknesses.

The fluid of the second layer of the device is at least one of electrically conductive or polar, for example the fluid of the second layer may be electrically conductive, polar, or both, and may comprise water, and/or a salt solution such as a solution of potassium chloride in water. The fluid of the second layer may be transparent; it may instead be coloured, for example, or absorbing. The fluid of the first layer of the device, which is electrically non-conductive, may for example include an alkane like decane or hexadecane, silicone oil or decalin (otherwise known as bicyclo-4,4,0-decane). Further details of the fluids of the first and second layers is provided below.

Electrically conductive typically means that the fluid of the second layer is capable of conducting electricity; for example an electrical current may flow through the fluid of the second layer due to the flow of ions through the fluid of the second layer. A polar second layer of fluid generally comprises at least one compound (for example a liquid vehicle) having a molecule with a net dipole. For example, across the molecular structure the molecule may have an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bond in the molecule, with for example one of the atoms being a heteroatom such as oxygen or nitrogen. For example, such a polar atom to atom bond is a bond between an oxygen (O) atom and a hydrogen (H) atom, for example an —O—H bond, which may be in some examples due to the presence of at least one hydroxyl (—OH) group. The presence of such bonds may cause hydrogen bonding between different molecules within the fluid of the second layer.

The fluid of the first layer may absorb at least a part of the visible spectrum. The fluid of the first layer may be transmissive for a part of the visible spectrum, forming a colour filter. For this purpose the fluid of the first layer may be coloured by addition of pigment particles or a dye. Alternatively, the fluid of the first layer may be black, for example absorb substantially all parts of the visible spectrum, or reflecting. A reflective fluid of the first layer may reflect the entire visible spectrum, making the layer appear white, or part of it, making it have a colour. In examples, the fluid of the first layer is black and therefore absorbs substantially all parts of the optical spectrum, for example in the visible light spectrum. Typically, substantially all parts of the optical spectrum may include a degree of variation, therefore the fluid of the first layer may not absorb all wavelengths, but the majority of wavelengths within a given spectrum such as the visible spectrum, so as to perform the function of the fluid of the first layer in the element. The fluid of the first layer may therefore be configured to absorb substantially all light incident on the fluid of the first layer. For example the fluid of the first layer may absorb 90% or more of light in the visible spectrum and incident on the first layer.

The first support plate 5 includes an insulating layer 13. The insulating layer may be transparent, for example fully transparent, for example transmissive at least to visible light. The insulating layer 13 may extend between walls of a display element. To avoid short circuits between the fluid of the second layer 12 and electrodes arranged under the insulating layer, layers of the insulating layer may extend uninterrupted over a plurality of display elements 2, as shown in the Figure. The insulating layer has a surface 14 facing, for example closest to, the space 10 of the display element 2. The thickness of the insulating layer may be less than 2 micrometers and may be less than 1 micrometer; for example the insulating layer may be 400 nanometers or less in thickness.

The insulating layer in examples described herein is for example formed of a layer 15 which is for example formed of a hydrophobic material such as Teflon AF1600® and a barrier layer 16 with predetermined dielectric properties, the layer 15 facing, for example being closer to, the space 10, as shown in the Figure. The barrier layer 16 may have a thickness, taken in a direction perpendicular to the plane of the substrate, of between 50 nanometers and 500 nanometers and may be made of an inorganic material like silicon oxide or silicon nitride.

In the absence of an applied voltage, for example with the applied voltage being a zero voltage, the fluid of the first layer adheres preferentially to the surface of the insulating layer 13 for adjoinment by the first layer, since the surface for adjoinment by the first layer has a higher, for example greater, wettability for the fluid of the first layer than for the fluid of the second layer; the surface may therefore be hydrophobic. As will be explained, with the applied voltage being a non-zero voltage or a driving voltage, the surface has a higher wettability for the fluid of the second layer than for the fluid of the first layer; for example the surface with the applied non-zero voltage may be considered to be hydrophilic. Wettability relates to the relative affinity of a fluid for the surface of a solid. Wettability may be measured by the contact angle between a boundary of the fluid and the surface of the solid. The contact angle is determined by the difference in surface tension between the fluid and the solid at the fluid-solid boundary. For example, a high difference in surface tension can indicate hydrophobic properties. As the skilled person will appreciate, a material may be considered to be hydrophobic if the contact angle with water is greater than 90 degrees; a material may therefore be considered to be hydrophilic if the contact angle with water is less than 90 degrees.

Each display element 2 includes a first electrode 17 as part of the support plate 5, which may otherwise be referred to as a support plate electrode. In examples shown there is one such first electrode 17 per element; in other examples there may be more than one first electrode per display element. The first electrode 17 is electrically insulated from the first and second layers by the insulating layer 13; electrodes of neighbouring display elements are separated by a non-conducting layer, although in other examples electrodes of one or more neighbouring display elements may be electrically connected. In some examples, further layers may be arranged between the insulating layer 13 and the first electrode 17. The first electrode 17 can be of any desired shape or form. The first electrode 17 of a display element is supplied with voltage signals by a signal line 18, schematically indicated in the Figure.

The second support plate 6 for example includes a second electrode 19, which may extend between walls of a display element, and/or be disposed, for example located, above and/or covering or overlapping the walls of the display element and/or extend uninterruptedly over a plurality of display elements 2, as shown in the Figure. The second electrode 19 is in electrical contact with the fluid of the second layer 12 and is common to all display elements. The first and second electrodes 17, 19 may be made of for example the transparent conductive material indium tin oxide (ITO). A second signal line 20 is connected to the second electrode 19. Alternatively, the second electrode may be arranged at a border of the support plates, where it is in electrical contact with the fluid of the second layer. This second electrode may be common to all elements, when they are fluidly interconnected by and share the fluid of the second layer, uninterrupted by walls. The display element 2 can be controlled by a voltage V applied between the signal lines 18 and 20. The signal line 18 can be coupled to a matrix of control lines on the substrate 7a. The signal lines 18 and 20 are coupled to a display driving system.

The fluid of the first layer in this example is confined to a display element by at least one wall, in this example walls 21, which follow the cross-section of the display element. The cross-section of a display element may have any shape; when the display elements are arranged in a matrix form, the cross-section is usually square or rectangular. Although the walls are shown as structures protruding from the insulating layer 13 and formed on a surface of the insulating layer 13, they may instead be part of a surface layer of the support plate that repels the fluid of the first layer, such as a hydrophilic or less hydrophobic layer. The walls may extend from the first to the second support plate but may instead extend partly from the first support plate to the second support plate as shown in FIG. 1.

The extent of the display element, indicated by the dashed lines 3 and 4, is defined by the center of the walls 21. The area of the surface between the walls of a display element, indicated by the dashed lines 22 and 23, is called the display area 24, over which a display effect occurs. The area of the surface on which the walls are formed may be referred to as the wall area. An extent of the surface 14 corresponding to the extent of the display area, for example a first area of the surface 14, may be more wettable to the first fluid than the second fluid and is in this example hydrophobic. The display effect depends on an extent that the fluids of the first and second layers adjoin the surface defined by the display area, in dependence on the magnitude of the applied voltage V described above. The magnitude of the applied voltage V therefore determines the configuration of the fluids of the first and second layers within the electrowetting element. In other words, the display effect depends on the configuration of the fluids of the first and second layers in the display element, which configuration depends on the magnitude of the voltage applied to the electrodes of the display element. The display effect gives rise to a display state of the display element for an observer looking at the display device. When switching the electrowetting element from one fluid configuration to a different fluid configuration the extent of the fluid of the second layer adjoining the display area surface may increase or decrease, with the extent of the fluid of the first layer adjoining the display area surface decreasing or increasing, respectively.

A sealing element (not shown) arranged on the first support plate 5 defines the lateral extent, for example a periphery, of the electrowetting device 1 in the example of FIG. 1. The sealing element may be used to confine the first and second layers 11, 12 to the electrowetting device 1. Additionally or alternatively, the sealing element may be used to seal the first support plate 5 to the second support plate 6. In examples, the sealing element seals a perimeter of the electrowetting device 1 and therefore may be formed as a rectangular or square shaped seal for example for surrounding a matrix of display elements of the electrowetting device 1 being manufactured. Therefore, the sealing element may be provided on the first support plate 5 with a suitable shape and of sufficient thickness for coupling the first support plate 5 to the second support plate 6. The sealing element may be hydrophilic to aid sealing of the electrowetting device 1.

Figure 2:
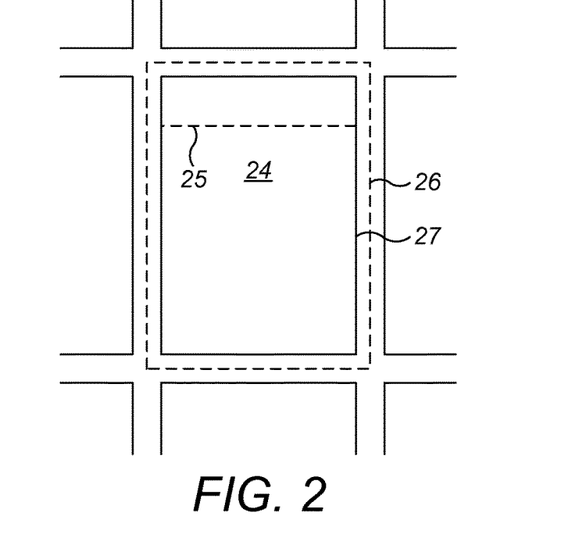
FIG. 2 shows schematically a plan view of the example electrowetting element of FIG. 1.

FIG. 2 shows a matrix of rectangular picture elements in a plan view of the hydrophobic surface of the first support plate. The extent of the central picture element in FIG. 2, corresponding to the dashed lines 3 and 4 in FIG. 1, is indicated by the dashed line 26. Line 27 indicates the inner border of a wall; the line 27 is also the edge of the display area 24.

When a zero or substantially zero voltage is applied between the first and second electrodes 17 and 19, for example when the electrowetting element is in an off state, the fluid of the first layer 11 forms a layer between the walls 21, as shown in FIG. 1. Application of a voltage will contract the fluid of the first layer, for example against a wall as shown by the dashed shape 25 in FIG. 1 or FIG. 2. The controllable shape of the fluid of the first layer, in dependence on the magnitude of applied voltage, is used to operate the picture element as a light valve, providing a display effect over the display area 24. For example, switching the fluids of the first and second layers to increase adjoinment of the fluid of the second layer with the display area may increase the brightness of the display effect provided by the element. This display effect determines the display state an observer will see when looking towards the viewing side of the display device. The display state can be from black to white with any intermediate grey state; in a colour display device, the display state may also include colour.

Examples of at least part of a method of manufacture of an electrowetting device will now be described. Specifically, these examples describe manufacture of an electrowetting display device in accordance with FIGS. 1 and 2. It is to be appreciated that in further examples the method applies to the manufacture of other types of electrowetting devices different from those specifically described with FIGS. 1 and 2.

Figure 3:
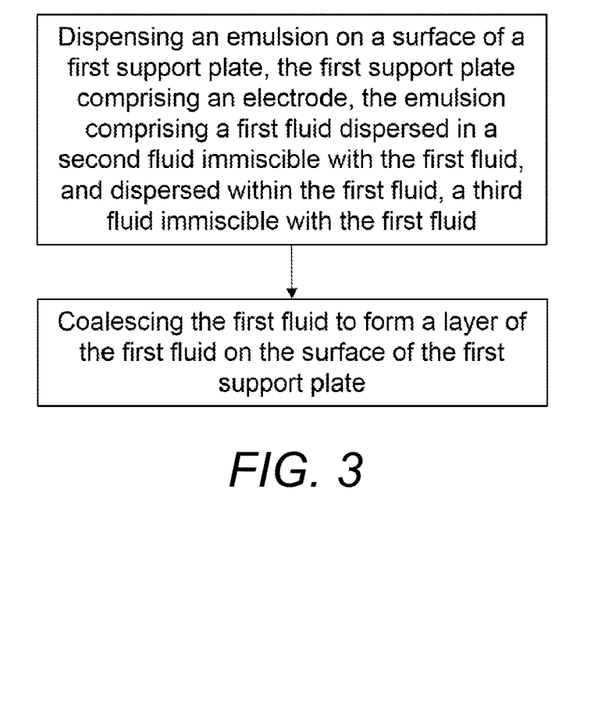
FIG. 3 is a flow diagram relating to examples of a method of manufacturing an electrowetting device.

FIG. 3 shows a flow diagram of part of a method of manufacturing an electrowetting device according to examples described herein. The example method of FIG. 3 includes dispensing an emulsion on a surface of a first support plate, such as the first support plate 5 described with reference to FIGS. 1 and 2. The first support plate comprises at least one electrode, for example an electrode or a plurality of electrodes. In examples, the surface comprises a first area more wettable to a first fluid than at least one of: a second fluid immiscible with the first fluid or a third fluid immiscible with the first fluid. The emulsion comprises the first fluid dispersed in the second fluid and, dispersed within the first fluid, the third fluid. The first fluid forms a layer of the first fluid on the surface of the first support plate. For example, the forming the layer of the first fluid may include coalescing the first fluid to form the layer of the first fluid.

Figure 4A:
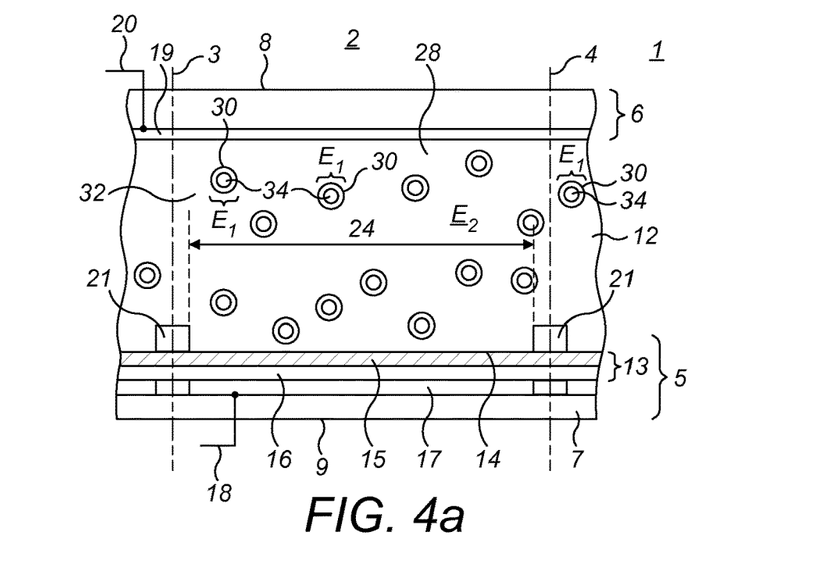
FIGS. 4a to 4c show schematically an example of part of a method of manufacturing an electrowetting device.
Figure 4B:
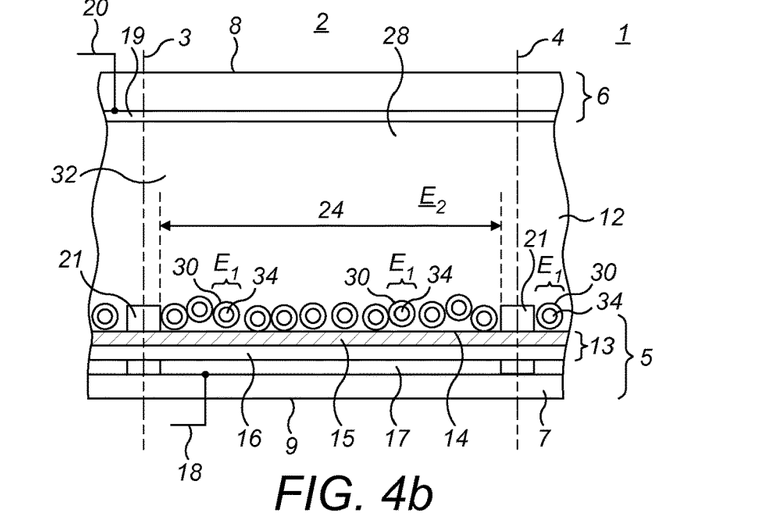
Figure 4C:
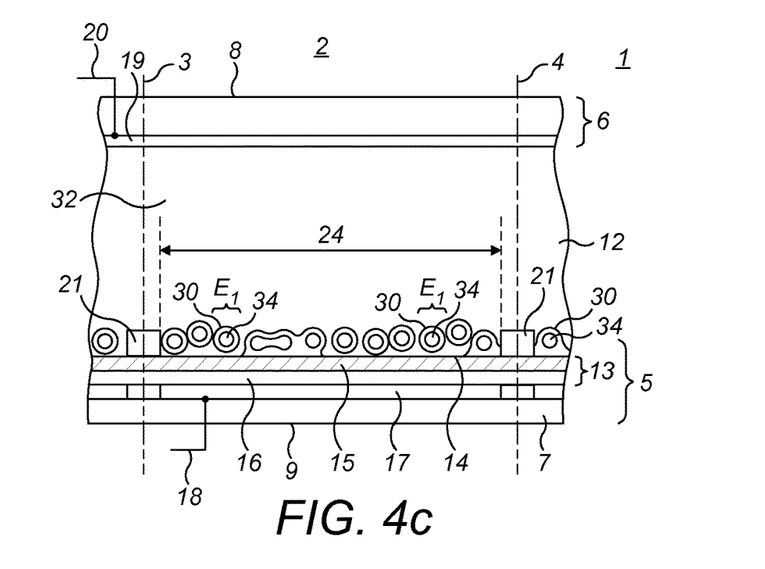

An example of part of a method of manufacturing an electrowetting device, for example an electrowetting display device, is shown schematically in FIG. 4, which includes FIGS. 4a to 4c. This method is an example of the examples of FIG. 3, though it is to be appreciated that further examples may be envisaged which accord with FIG. 3 but which have some features in common with and/or are different from those described using FIG. 4, as the skilled person will understand. The example of FIG. 4 shows part of an example method for manufacturing the electrowetting device 1 of FIGS. 1 and 2; features of the electrowetting device 1 of FIGS. 1 and 2 shown in FIG. 4 are labelled using the same reference numerals and corresponding descriptions should be taken to apply. As described above with reference to FIG. 3, the method of FIG. 4 can also be used to manufacture electrowetting devices different from that of FIGS. 1 and 2.

The example method of FIG. 4 involves dispensing an emulsion 28 on the surface 14 of the first support plate 5, for example on the display area 24 described previously; this is shown in FIG. 4a. Dispensing typically involves providing, supplying or depositing the emulsion 28 such that it is in contact with the surface 14. In this example, the first support plate 5 is provided fully pre-assembled and includes the electrode 17 and the walls 21. However, in other examples, the first support plate may be partially pre-assembled and further assembly may be performed after dispensing the emulsion 28. The surface 14 of the first support plate 5 on which the emulsion 28 is dispensed may have a first area more wettable to the first fluid than at least one of: the second fluid or the third fluid. The first area is hydrophobic in the example of FIG. 4 and is more wettable to the first fluid than both the second fluid and the third fluid. In other examples, the emulsion 28 may be dispensed on a surface of a support plate with one or more areas with other wettability properties. Alternatively, the first area may cover the entirety, or substantially all, for example 90% or more, of the surface of the support plate.

The emulsion 28 in this example may be considered a double emulsion. In this example, there is an emulsion of a first fluid 30 and a third fluid 34. This emulsion of the first and third fluids 30, 34 is itself emulsified in a second fluid 32. Thus, it may be considered that, in FIG. 4, there is a first emulsion $E_1$ of the first fluid 30 and the third fluid 34 and a second emulsion $E_2$ of the second fluid 32 and the first emulsion $E_1$. The first and second emulsions $E_1$, $E_2$ in this example form a double emulsion. In the first emulsion $E_1$, the third fluid 34 is the dispersed phase and the first fluid 30 is the continuous phase. The first fluid 30 with the third fluid 34 dispersed in it (the first emulsion $E_1$) is itself the dispersed phase in the second emulsion $E_2$; the second fluid 32 is the continuous phase in the second emulsion $E_2$. The first fluid 30 in this example forms a shell, barrier or separating layer between the second fluid 32 and the third fluid 34 such that the third fluid 34 is separated from the second fluid 32 by the first fluid 30. The first fluid 30 may therefore be considered as a layer which encapsulates the third fluid 34. In this example, the third fluid 34 is in the form of a droplet, which is typically an approximately spherical, or spherical, quantity of fluid although other shapes are possible, for example pendant-shaped or egg-shaped. Each droplet of the third fluid 34 is surrounded by a layer of the first fluid 30 such that the combined first fluid 30 and droplet of third fluid 34 also has the form of a droplet in this example. In this example, the layer of the first fluid 30 contains, for example by enveloping, surrounding or coating, a droplet of third fluid 34. In other examples, the layer of the first fluid 30 may contain more than one droplet of third fluid 34. The first emulsion $E_1$ of the first fluid 30 and the third fluid 34 is dispersed in the continuous second fluid 32 to form the second emulsion $E_2$. The first, second and third fluids 30, 32, 34 are described in further detail below.

The example method of FIG. 4 includes bringing the first fluid into contact with the surface of the first support plate. This is shown in FIG. 4b. The first fluid 30 may be brought into contact with the surface 14 of the first support plate 5 due to a difference in density of the first fluid 30 and the third fluid 34 within the first fluid 30 and the second fluid 32. For example, the first emulsion $E_1$ may move or drift through the second fluid 32 towards the first support plate 5 under gravity where the first and/or third fluids 30, 34 are more dense than the second fluid 32 and where the first support plate 5 is below the fluids. In other examples, different mechanisms may be used to bring, or move, the first fluid into contact with the surface of the first support plate, as will be described later.

Bringing the first fluid 30 into contact with the surface 14 of the first support plate 5 in examples initiates the first fluid 30 coalescing, as shown schematically in FIG. 4c. The coalescence generally involves discrete portions of the first fluid joining together, combining or amalgamating with each other to form a layer of the first fluid. In this example, the layer of the first fluid 30 forms the first layer 11 illustrated in FIGS. 1 and 2.

In examples such as that of FIG. 4c, the first fluid is brought into contact with a first area of the surface of the first support plate to initiate the first fluid coalescing, the first area having a higher wettability for the first fluid than for at least one of the second fluid or the third fluid. In the example of FIG. 4c, the first area of the surface 14 is the display area 24. The display area 24 in this example is between the walls 21 and is hydrophobic. The display area 24 of the surface 14 in this example has a higher wettability for the first fluid 30 than for the second and third fluids 32, 34 such that the first fluid 30 tends to spread out and wet the display area 24 when it comes into contact with the first area of the surface 14. This therefore causes nearby portions of first fluid 30, for example portions which are neighbouring, adjacent or close by, to touch each other and join up into larger portions. As will be appreciated, in other examples, the surface of the first support plate may have different wettability properties and the coalescing may be initiated in other ways, for example due to a force of impact of the first fluid with the surface or due to a change in surface tension of the first fluid when touching the surface.

As the first fluid coalesces, this can cause the third fluid previously dispersed in the first fluid to be released. For example, as the first fluid 30 spreads out to wet the surface 14 or joins with other portions of first fluid 30, a layer of the first fluid 30 can break up to free the third fluid 34 so that the first fluid 30 no longer surrounds the third fluid 34, releasing the third fluid 34 into the second fluid 32. For example, coalescence of the first fluid 30 may cause phase separation of the emulsion of the first fluid 30 and the third fluid 34 such that the first fluid 30 separates from the third fluid 34 to form the layer of the first fluid 30 and the third fluid 34 transfers into the second fluid 32. In examples, the second fluid and the third fluid of the emulsion mix to form, on the layer of the first fluid, a second layer comprising the second fluid and the third fluid. For example, where the second and third fluid 32, 34 are miscible with each other, they may mix for example such that they are physically combined but with each of the second and third fluid 32, 34 retaining its own chemical identity. For example, a mixture of the second and third fluid 32, 34 may be a solution, possibly with physical interactions between the different chemical molecules. Hence, mixing of the second fluid 32 and the third fluid 34 in examples does not involve a chemical reaction between the second fluid 32 and the third fluid 34 to form a difference species.

In examples, the layer of the first fluid 30 and the second layer of the mixture of the second and third fluids 32, 34 remain distinct, for example where the layer of the first fluid 30 and the second layer of the second and third fluids 32, 34 are substantially immiscible with each other; as described above, there may be a meniscus at a boundary between the layers. Layers of fluid are typically a coating, covering or quantity of a fluid on an element, which, in some cases, for example where an underlying surface beneath the layer has a planar surface parallel to the horizontal, may have a substantially uniform thickness.

In other examples, the second and third fluids 32, 34 do not mix, for example if they are immiscible with each other. In such examples, there may be a separate, distinct layer of each of the second fluid and the third fluid.

The first fluid is electrically non-conductive and the second fluid and the third fluid are each at least one of electrically conductive or polar in examples such as that of FIG. 4. In the example of FIG. 4, and other examples, the layer of the first fluid 30 has the properties of the first layer 11 of fluid described above with reference to FIGS. 1 and 2. In FIG. 4, the second and third fluids 32, 34 mix with each other to form the second layer, which has the properties of the second layer 12 of fluid shown in FIGS. 1 and 2.

After the second layer has been formed, the second support plate 6 may be applied on a surface of the second layer, the second layer being located between the second support plate and the layer of the first fluid. For example, the second support plate 6 may be attached to the first support plate 5 such that the second layer and layer of the first fluid are between the first and second support plates 5, 6. Therefore, the second layer may act as a barrier between the layer of the first fluid and the second support plate, preventing or restricting contact with the second support plate. This may prevent adherence of the first fluid to the second support plate, which can occur if the first fluid and the second support plate come into contact. Adherence of the first fluid to the second support plate can reduce the display quality, for example if the first fluid is coloured and blocks light from passing through a portion of the display element due to its position on the second support plate. Therefore, with the second layer acting as a barrier and substantially blocking or restricting the first fluid from adjoining the second support plate, the display quality may be improved compared with an electrowetting device manufactured without providing such a barrier layer. The second support plate 6 may be applied by dragging the second support plate 6 across the surface of the second layer, or by placing the second support plate 6 on top of the second layer; other methods for applying the second support plate are also possible.

As described with reference to FIG. 4, in examples the first fluid which forms the first layer of the manufactured electrowetting device is dispensed as a layer, covering or coating surrounding the third fluid, which may be relatively thin compared with a size of the third fluid being surrounded. This allows a small and accurately controlled quantity of the first fluid to be dispensed. For example, the volume of the first fluid 30 in the emulsion 28 may be a volume of the first fluid 30 for the electrowetting device.

In examples, the method allows a smaller quantity of the first fluid to be dispensed than a known method of manufacture. This may reduce the cost of the manufacture of the electrowetting device where the first fluid is expensive. Furthermore, by dispensing a smaller quantity, for example a smaller volume, of the first fluid, a mechanically robust electrowetting device can be obtained without the need for spacers. Spacers are used in a known electrowetting device to reduce the displacement of the first and second support plates relative to each other, thereby reducing unwanted effects. Such unwanted effects include for example a "lowered ceiling effect" which may occur when pressure is exerted on the second support plate, for example by a finger, causing the second support plate to move towards the first support plate. If the distance between the support plates becomes small enough, the first fluid will adhere to the second support plate, reducing the display quality. A further undesirable display effect which may be reduced by arranging spacers between the first and second support plates is what may be referred to as a "tsunami effect". This can occur if a pressure pulse is exerted on the second support plate creating a shock wave, which may cause the first fluid to flow over a picture element. However, using the manufacturing method of examples described herein, spacers may not be necessary as a sufficiently small quantity of first fluid can be more accurately dispensed in each electrowetting element that these unwanted effects do not occur. Furthermore, in such examples the method may be used to manufacture electrowetting elements with relatively high walls for confining the layer of the first fluid on at least part of the surface of the first support plate. Relatively high walls may also increase the robustness of the electrowetting device, by for example performing a role of a spacer, and may reduce the unwanted effects described above without the need for spacers. Accordingly, the method according to examples and an electrowetting device made using the method may be less complex than with a known method, as there may be no need to include spacers in the electrowetting device nor to align spacers with pixel walls, which can be difficult to perform accurately.

This is counterintuitive; a known method in which an emulsion of the first and second fluids is provided suffers from difficulties in accurately dispensing a desired quantity of the fluids therefore it is surprising that the method according to examples, which also involves the use of an emulsion, can overcome such difficulties. Nevertheless, the inventors have realized that the use of the double emulsion of the first, second and third fluids 30, 32, 34 can allow the quantities of the fluids in an electrowetting device to be precisely regulated.

In examples, such as that of FIG. 4, the first support plate 5 has at least one wall 21 for confining the layer of the first fluid 30 on at least one part of the surface 14; in this case the first fluid 30 is confined to the display area 24 as explained above. In such examples, the volume of the first fluid in the emulsion may correspond to a thickness of the layer of the first fluid on the surface which is substantially equal to, for example equal to or equal to within acceptable measuring variations, or less than a height of the at least one wall, for example within 10% or 5% of the height of the at least one wall. With this volume of the first fluid, the unwanted effects described above may be further reduced as the layer of first fluid is adequately confined by the at least one wall. In contrast, in a known method of manufacture, it is difficult to obtain a layer of first fluid with such a thickness, for example where the walls are relatively low and it is desired to obtain a layer of the first fluid which is thin enough to lie below the top of the walls.

The surface 14 of the first support plate 5 described above with reference to FIG. 4 has a first area with a higher wettability for the first fluid 30 than for the second and third fluids 32, 34. In examples such as this, the surface may also have a second area with a higher wettability for at least one of the second fluid or the third fluid than for the first fluid. In such examples, at least one of the second fluid or the third fluid may displace the first fluid from the second area of the surface of the first support plate. For example, the first support plate may have a second area which repels the first fluid to confine the first fluid to the display area, such as a hydrophilic or less hydrophobic area. The second area may replace walls protruding from the surface of the support plate or there may be a second area of the first support plate in addition to protruding walls. As the first area is more wettable to the first fluid and the second area is more wettable to the second and/or the third fluid in such examples, the first fluid will preferentially adhere to the first area and the second and/or third fluid will preferentially adhere to the second area. Hence, first fluid will be removed, for example driven off, from the second area by the second and/or third fluids. This can therefore reduce the need to clean the walls of the device to remove excess first fluid. It can also improve the confinement of the first fluid to the electrowetting element.

Examples of the first, second and third fluids will now be described in more detail.

The first fluid in examples is electrically non-conductive; it may also be non-polar in examples. It may be, for example, an alkane like decane ($CH_3(CH_2)_8CH_3$) or hexadecane ($CH_3(CH_2)_4CH_3$), an oil, for example silicone oil like for example hexamethyldisiloxane $O-(Si(CH_3)_3)_2$, or a cyclo-alkane such as decalin (otherwise known as bicyclo-4,4,0-decane ($C_{10}H_{18}$). The first fluid may comprise at least one dye, for example a black, red, green, blue or white dye. A dye in the first fluid may for example be a naphthoquinone dye, an anthraquinone dye, an azo dye, a thienylazo dye and/or a Foron® dye.

In examples of the second fluid and the third fluid, the second fluid and/or the third fluid is at least one of electrically conductive or polar and may be considered to be an electrolyte. The second fluid and the third fluid may be substantially the same, or the same, as each other or different. In examples, each of the second fluid and/or the third fluid comprise at least one of water, a polyether; a peroxide; a polyol such as a diol, a triol and/or a tetraol; an ether; dioxalane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; and/or glutaric acid; a tricarboxylic acid; citric acid; aconitic acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; polyethylene glycol; propylene glycol; erythritol; ethylene glycol; glycerol; butanetriol; derivatives thereof; or combinations thereof. A heteroatom in examples is for example nitrogen (N), sulphur (S), boron (B) or phosphorus (P) or a halogen atom such as chlorine (Cl), fluorine (F), bromine (Br) or iodine (I).

In some examples, the second fluid and/or the third fluid comprise a non-aqueous component, for example a component which is not water, selected from the group consisting of: ethylene glycol; diethyleneglycol; polyethylene glycol; propylene glycol; dioxalane; glyoxal; citric acid; oxalic acid; oxamic acid; glycerol; or formic acid. In further examples, the second fluid and/or the third fluid includes a different second non-aqueous component selected from the group consisting of: erythritol; ethylene carbonate; propylene carbonate; ethylene glycol; glycerol; and butanetriol. In some such examples the non-aqueous components of the second fluid and/or the third fluid are ethylene glycol and ethylene carbonate, ethylene glycol and propylene carbonate, ethylene glycol and glycerol, diethylene glycol and glycerol, or polyethylene glycol and glycerol. In some such examples described above, the second fluid and/or the third fluid comprises zero, approximately zero, or a hygroscopic amount of water, for example a maximum hygroscopic amount of water, in addition to the non-aqueous components. In other examples, the second fluid and/or the third fluid comprises more than a hygroscopic amount of water, in addition to the non-aqueous components, for example the water content of the second fluid and/or the third fluid is at least one of: less than 35 wt %, 30 wt % or less, 15 wt % or less, 10 wt % or less, 5 wt % or less, 3 wt % or less, 1.5 wt % or less, 5 wt % or greater, 0.5 wt % or greater, 0.05 wt % or greater, for example 0.5 wt % to 15 wt %, or 0.05 wt % to 15 wt %, or 0.05 wt % to 1.5 wt %, or 0 to 0.5 wt %. In some such examples including water, the second fluid and the third fluid have suitable properties to form the second layer to provide suitable switching and/or reflective properties for the electrowetting device. Such a non-aqueous component may for example be a liquid non-aqueous component.

It is to be appreciated that in examples described above, any component of any of the first fluid, the second fluid and the third fluid described (for example an oil or alkane of the first fluid, or a polyol of the second and/or third fluid) may be present in greater than trace amounts. For example, any component of the first, second or third fluids may form a substantial portion, for example 50% or more (by weight or by volume) of the respective fluid.

In examples, the third fluid may comprise a salt of a sufficient concentration such that it is sufficiently electrically conductive. For example, the third fluid may comprise a salt with a concentration in the range of around 0.25 grams per liter of electrolyte (g/l) to around 2.25 grams per liter of electrolyte (g/l), for example 0.25 g/l to 2.25 g/l, to give a conductivity in the range of around 10 micro Siemens per centimeter ($\mu$S/cm) to around 100 micro Siemens per centimeter ($\rho$S/cm), for example 10 to 100 $\mu$S/cm. A suitable salt is, for example, potassium chloride (KCl).

Figure 5:
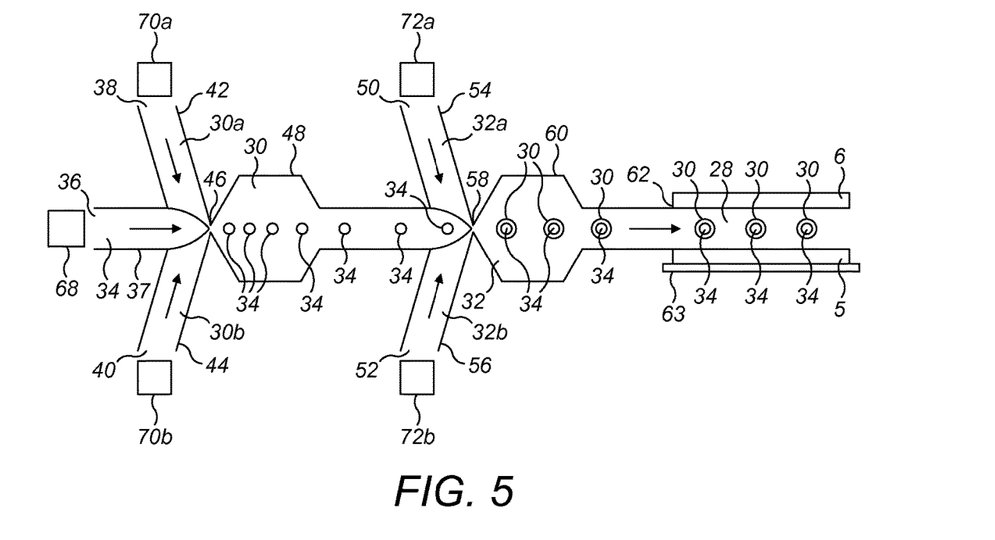
FIG. 5 shows schematically a further example of part of a method of manufacturing an electrowetting device.

FIG. 5 shows schematically a further example of part of a method of manufacture of an electrowetting device, such as the electrowetting device 1 of FIGS. 1 and 2, although the method can be used to manufacture other examples of electrowetting devices as the skilled person will appreciate. Features of FIG. 5 in common with FIGS. 1, 2 and 4 are labelled with the same reference numerals; corresponding descriptions should be taken to apply.

The example method of FIG. 5 uses what may be referred to as a microfluidic emulsification technique or process to produce the emulsion 28 of the first fluid 30 dispersed in the second fluid 32. As for the example method of FIG. 4, the third fluid 34 is dispersed within the first fluid 30 and both the second fluid 32 and the third fluid 34 are immiscible with the first fluid 30. The emulsion produced by the method of FIG. 5 is therefore of the type generally referred to as a double emulsion, with an emulsion of the first fluid 30 and the third fluid 34 emulsified in the second fluid 32 as described above with reference to FIG. 4.

The example microfluidic emulsification process illustrated in FIG. 5 manipulates the movement of fluids, for example as streams or flows, to obtain the emulsion. The direction of fluid flow is illustrated schematically in FIG. 5 using arrows. As can be seen in FIG. 5, the fluids may move either as a continuous flow or stream or as a discontinuous flow or stream of discrete portions of fluid, for example as a discontinuous sequence of separate droplets of fluid.

In examples such as that of FIG. 5 a stream of the third fluid is dispensed into a stream of the first fluid to disperse the third fluid into the first fluid, before dispensing the emulsion on the surface of the first support plate. This is illustrated schematically in FIG. 5. In FIG. 5, a stream of the third fluid 34 is released from a first inlet 36. The third fluid 34 flows in a first channel 37, which is for example a passageway, such as that formed by a tube, pipe or other conduit, towards the first fluid 30.

Example methods may involve dispensing a first stream of the first fluid, dispensing a second stream of the first fluid towards the first stream of the first fluid, and dispensing the stream of the third fluid into the first fluid in a region where the first stream of the first fluid meets the second stream of the first fluid. Such a method is shown in FIG. 5. In FIG. 5, the first and second streams 30a, 30b of the first fluid are dispensed via second and third inlets 38, 40 into second and third channels 42, 44. The first and second streams 30a, 30b of the first fluid flow towards each other and towards the stream of the third fluid 34. The stream of the third fluid 34 is directed towards the first and second streams 30a, 30b of the first fluid via the first channel 37 such that the third fluid 34 meets the first fluid in a region or area in which the first and second streams 30a, 30b also meet each other. It is to be noted that a wall of a channel described herein is illustrated schematically in the Figures with a single line, for clarity.

In examples, the first stream of the first fluid is dispensed in a first direction and the second stream of the first fluid is dispensed in a second direction substantially opposing the first direction. The stream of the third fluid is dispensed into the first fluid in the region where the first stream of the first fluid meets the second stream of the first fluid in a direction substantially perpendicular to the first direction and the second direction. This is shown in FIG. 5, in which the first and second streams 30a, 30b of the first fluid flow in a direction approximately opposite to each other. In this example, an angular separation between the first and second streams 30a, 30b of the first fluid is roughly 160 degrees, although in other examples the angular separation may be around 180 degrees plus or minus 45 degrees for the first and second streams 30a, 30b to substantially oppose each other. As will be appreciated, with the first and second streams 30a, 30b of the first fluid substantially opposing each other, the first and second streams 30a, 30b flow approximately towards each other but in directions which differ by between around 180 degrees plus or minus 45 degrees. The stream of the third fluid 34 is substantially perpendicular to the first and second directions of the first and second streams 30a, 30b of the first fluid respectively such that, for example, an angular separation between the stream of the third fluid 34 and each of the first and second streams 30a, 30b of the first fluid is roughly 90 degrees plus or minus 20 degrees. In other examples, an angular separation between the stream of the third fluid 34 and a long axis of the dispensing apparatus, which in examples is a horizontal axis, may be up to around 45 degrees. The relative angles between the streams of the first, second and third fluids may be controlled to adjust the flow rates of the first, second and third fluids respectively to obtain a desired rate of production of the electrowetting device.

With the first and third fluids 30, 34 dispensed in this way, the stream of the third fluid 34 is constricted by the first and second streams 30a, 30b of the first fluid, which are incident on the stream of the third fluid 34 on opposing sides, thereby applying pressure to the stream of the third fluid 34. The pressure gradient applied to the stream of the third fluid 34 in examples applies shear force sufficient to disperse droplets of the third fluid 34 in the first fluid 30. For example, the constriction of the third fluid 34 by the first fluid 30 will cause the third fluid 34 to break into a discontinuous stream of discrete droplets to minimise the surface area of the third fluid 34 in examples. This is as a result of the Plateau-Rayleigh instability, as the skilled person will understand.

The size distribution of the droplets of the third fluid 34 can be controlled by adjusting the surface energy properties of the first and third fluids (for example by altering the composition of the first and third fluids), a viscosity difference between the first and third fluids, a pressure difference at the junction between the first and second streams 30a, 30b of the first fluid and the stream of the third fluid 34 and the relative flow rates of the first and third fluids 30, 34.

In the example of FIG. 5, the first and third fluids 30, 34 are forced, and flow, through a first narrow channel 46 (which may be referred to as a first nozzle or orifice) which further aids the break-up, and hence dispersion, of the continuous stream of third fluid 34 into droplets in the first fluid 30. For example, the first narrow channel 46 may further increase the pressure and hence shear force applied to the third fluid 34, thus helping to break the third fluid 34 up into droplets. In examples, the size of the droplets of the third fluid 34 depend on the size of the first narrow channel 46. For example, the size of the droplets of the third fluid 34 may be comparable to the size of the first narrow channel 46. The first narrow channel 46 in examples is narrower than the first, second and third channels 37, 42, 44 supplying the third fluid 34 and the first and second streams 30a, 30b of the first fluid, for example with a smaller diameter or width. The region or area in which the third fluid 34 meets the first fluid 30 may be referred to as a cross-junction or T-junction.

After passing through the first narrow channel 46, the first fluid 30 with droplets of third fluid 34 dispersed in it passes into a first wide channel 48, which may have a diameter or width in a direction perpendicular to a direction of flow of the first fluid 30 of approximately 100 micrometers (μm) to 500 μm. In the first wide channel 48, the pressure and flow speed of the first and third fluids 30, 34 decreases with respect to the pressure and flow speed of the first and third fluids 30, 34 as they pass through the first narrow tube 46. Nevertheless, the first and third fluids 30, 34 continue to move through the first wide channel 48 towards the second fluid 32. In examples, the third fluid 34 flows through the first wide channel 48 in a central region or area, via laminar annular flow, although other flow types are possible.

Example methods involve dispensing the stream of the first fluid, with the third fluid dispersed in the first fluid, into a stream of the second fluid to disperse the first fluid, with the third fluid dispersed in the first fluid, in the second fluid to form the emulsion. Further examples include dispensing a first stream of the second fluid, dispensing a second stream of the second fluid towards the first stream of the second fluid, and dispensing a stream of the first fluid, with the third fluid dispersed in the first fluid, into the second fluid in a region where the first stream of the second fluid meets the second stream of the second fluid, to form an emulsion. FIG. 5 shows such examples.

In FIG. 5, the stream of the first fluid 30, within which droplets of the third fluid 34 are dispersed moves towards the second fluid 32, which is dispensed in two streams 32a, 32b. The first and second streams 32a, 32b of the second fluid also flow towards the first fluid 30 and the third fluid 34 from fourth and fifth inlets 50, 52 via fourth and fifth channels 54, 56 respectively. The first and second streams 32a, 32b of the second fluid therefore meet the stream of the first fluid 30 with dispersed third fluid 34. The first fluid 30 with the third fluid 34 dispersed therein are dispersed in to the second fluid 32 at the region, for example the area or junction, where the first, second and third fluids 30, 32, 34 meet, thereby forming the emulsion 28 described above, which is a double emulsion.

In examples, the first stream of the second fluid is dispensed in a third direction, the second stream of the second fluid is dispensed towards the first stream of the second fluid in a fourth direction substantially opposing the third direction, and the stream of the first fluid, with the third fluid dispersed in the first fluid, is dispensed into the second fluid in a region where the first stream of the second fluid meets the second stream of the second fluid, in a direction substantially perpendicular to the third direction and the fourth direction, to form the emulsion. Such an example is shown in FIG. 5, where the directions are substantially opposing and substantially perpendicular as described above with respect to the dispensing of the first and second streams 30a, 30b of the first fluid and the third fluid 34.

The first fluid 30 with the dispersed third fluid 34 is dispersed into the second fluid 32 similarly to the dispersing of the third fluid 34 into the first fluid 30. The first, second and third fluids 30, 32, 34 pass through a second narrow channel 58 to further aid the production of the emulsion 28, although this second narrow channel 58 can be omitted as the skilled person will understand. The emulsion 28 then travels through a second wide channel 60, which is used to dispense the emulsion 28 onto the first support plate 5. For example, the emulsion 28 may travel through the second wide channel 60 to reach an outlet 62 which is aligned with the space 10 between the first and second support plates 5, 6, allowing the emulsion 28 to pass through the wider channel 60, into the space 10 and onto the first support plate 5. The first fluid 30 then forms a layer of the first fluid 30 on the surface 14 of the first support plate 5, for example by coalescence of the first fluid 30 as described above with reference to FIG. 4c. The first support plate 5 in examples is held by, for example resting on or supported by, a support plate holder 63, which is for example another plate upon which the first support plate may be arranged or a roller or belt system upon which a flexible first support plate may be moved.

In the example of FIG. 5, the geometry of the microfluidic apparatus is chosen to avoid contact between the first fluid 30 and the third fluid 34 and the walls of the channels. As the skilled person will appreciate, other geometries may be used.

An apparatus such as that of FIG. 5 can be used to generate droplets of third fluid 34 with a minimum size of around 10 micrometers (μm) (10×10$^{-6}$ meters). A layer of first fluid 30 can be deposited to surround the third fluid 34 such that the first fluid 30 containing the third fluid 34 has a minimum diameter of around 15 micrometers (μm). With these dimensions, the volume of the first fluid for a single droplet of first fluid 30 containing the third fluid 34 is around 1.2 pico liters (1.2×10$^{-9}$ liters). A typical electrowetting element has dimensions of (3×60×120)×10$^{-6}$ μm, giving a volume of 22 pico liters. Thus, around 18 droplets of first fluid 30 containing the third fluid 34 are needed to fill each typical electrowetting element, for example.

In the example described above with reference to FIG. 4c and FIG. 5, the first fluid 30 comes into contact with the first support plate 5 as a result of a difference in density between the first and third fluids 30, 34 and the second fluid 32. However, in other examples, where the third fluid is electrically charged, for example with the third fluid comprising a salt of an appropriate concentration, and the second fluid is at least one of electroconductive or polar, the first fluid 30 may be brought into contact with the surface 14 of the first support plate 5 by applying an electric field between the electrode 17 in the first support plate 5 and the second fluid 32, to move the first fluid 30, with the third fluid 34 dispersed within the first fluid 30, towards the surface 14 of the first support plate 5. In examples, this may increase the speed at which the first fluid 30 is brought into contact with the surface 14 compared with other examples in which no electric field is applied and therefore increase the speed or rate at which the first layer 11 is formed, for example by coalescence of the first fluid 30. This electric field may be obtained by applying a potential difference between the electrode 17 in the first support plate 5 and the electrode 19 in the second support plate 6, as will be described in more detail below. As an electric field can be applied separately in each electrowetting element 2, the coalescing of the first fluid 30 in each electrowetting element 2 can be accurately controlled, in turn also allowing the thickness or volume of the first layer 11 in each electrowetting element 2 to be precisely regulated.

In some examples, the third fluid may be dispensed pre-charged. In other examples, in which the third fluid is at least one of electrically conductive or polar, the method of FIG. 5 further includes electrically charging the third fluid, before dispensing the emulsion on the surface of the first support plate. For example, where a microfluidic process such as that of FIG. 5 is used, the method may include applying a potential difference across the region where the first stream of the first fluid meets the second stream of the first fluid, to electrically charge the third fluid. Such an example is illustrated schematically in FIG. 6. Features of FIG. 6 similar to those described with reference to FIG. 5 are referred to here using the same reference numerals incremented by 100; corresponding descriptions should be taken to apply also.

Figure 6:
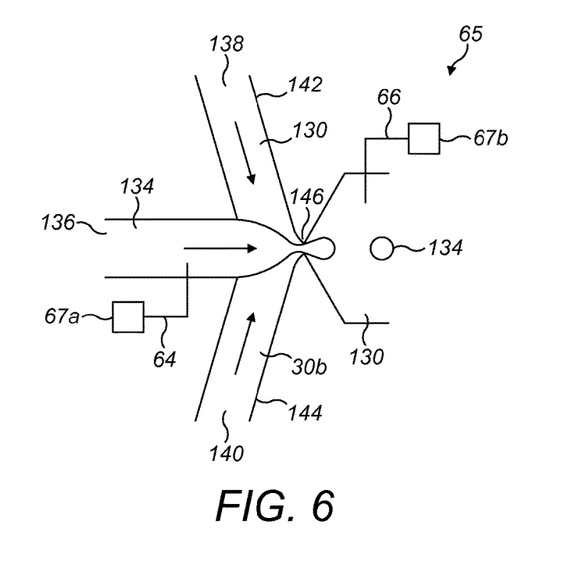
FIG. 6 shows schematically another example of part of a method of manufacturing an electrowetting device.

FIG. 6 shows an electric field application system 65 according to examples. In FIG. 6, a first electrode 64 is in electrical contact with the third fluid 134, which is at least one of electrically conductive or polar, in a region before the third fluid 134 reaches the junction with the first fluid 130. A second electrode 66 is arranged on the opposite side of the junction to the stream of the third fluid 134 such that there is a voltage drop across the junction. The first electrode 64 and the second electrode 66 are connected to electric field generators 67a, 67b to apply a given electric potential to the first and second electrodes 64, 66 respectively. The electric field generators 67a, 67b are shown separately in FIG. 6, however in other examples the first and second electrodes may be connected to a combined electric field generator, for example a voltage source with two terminals, one terminal connected to the first electrode and the other connected to the second electrode. In further examples, one of the first and second electrodes is connected to an electric field generator and the other one of the first and second electrodes is connected to ground. For example, the first electrode 64 in electrical contact with the third fluid 134 may be connected to ground with a positive or negative charge applied to the second electrode. As the grounded third fluid 134 carries no current, a voltage drop occurs across an interface between the third fluid 134 and the first fluid 130 and the charged second electrode 66. When the stream of the third fluid 134 breaks into a droplet, the charge at the interface between the third fluid 134 and the first fluid 130 remains on the droplet of the third fluid 134, with excess charges uniformly distributed on the surface of the droplet of the third fluid 134.

The electrical charge Q of a pendant droplet forming the dispersed phase of an emulsion can be given by:

$$Q = \varepsilon_r \varepsilon_0 E dA$$

where $\varepsilon_r$ is the relative permittivity of the continuous phase of the emulsion, $\varepsilon_0$ is the vacuum permittivity, E is the electric field applied to the droplet and A is the surface area of the droplet.

Rayleigh defined the limiting electrical charge of a droplet in air as:

$$Q_{max} = 8\pi \sqrt{\varepsilon_r \varepsilon_0 \gamma r^3}$$

where $Q_{max}$ is the maximum electrical charge of the droplet, r is the radius of the droplet, γ is the surface tension of the dispersed phase, $\varepsilon_r$ is the relative permittivity of the continuous phase of the emulsion, which is air in this example, and $\varepsilon_0$ is the vacuum permittivity as defined above. Using this, the minimum voltage to be applied across the stream of the first fluid 130 for stable charging of droplets of the third fluid 134 can be calculated and evaluated over time and adjusted if required.

With the emulsion comprising charged droplets of the third fluid 134 in the first fluid 130 dispersed in the second fluid 132 dispensed on a first support plate, such as the first support plate 5 described above with reference to FIGS. 1 and 2, the system can be considered as a capacitor, with a capacitance C given by:

$$C = \frac{\varepsilon_i \varepsilon_e \varepsilon_0 S}{t\varepsilon_e + (d-t)\varepsilon_i}$$

where d is the distance between the first electrode 17 of the first support plate 5 and the second electrode 19 of the second support plate 6, t is the thickness of the insulator layer, $\varepsilon_0$ is the vacuum permittivity, $\varepsilon_i$ is the insulator permittivity, $\varepsilon_e$ is the emulsion permittivity, and S is the surface area of overlap between the first support plate 5 and the second support plate 6.

When a voltage drop V is applied across the electrowetting element, an electric field E is generated and the droplet is exposed to an electric force given by:

$$F_e = qE = CVE = \frac{CV^2}{d-t}$$

Motion of the droplet of the first fluid 130 containing the third fluid 134 will be driven by the competition between a drag force $F_D$, a buoyancy force $F_A$ and an electric force $F_E$:

$$F_D = 6\pi a \eta \upsilon$$

$$F_A = (\rho_c - \rho_d)gV_d$$

$$F_E = qE = \frac{\varepsilon_i \varepsilon_e \varepsilon_0 S}{t\varepsilon_e + (d-t)\varepsilon_i} \frac{V^2}{(d-t)}$$

where q is the charge, E is the electric field, $\rho_c$ and $\rho_d$ are the density of the continuous and dispersed phases of the emulsion respectively, g is the acceleration due to gravity, $V_d$ is the volume of the droplet, $\alpha$ is the radius of the droplet, $\eta$ is the viscosity of the continuous phase (the second fluid 32) and $\upsilon$ is the velocity of the droplet.

When an electric field is applied, considering $Q_{max}$ as defined above as the maximum charge of the droplet, the velocity of the droplet $\upsilon$ can be estimated as:

$$\upsilon = \frac{qE + (\rho_c - \rho_d)gV_d}{6\pi a \eta}$$

Therefore, the speed at which the first fluid 130 containing the third fluid 134, for example a body or a droplet of the first fluid containing the third fluid, moves towards the surface 14 of the first support plate 5 can be calculated and controlled, by controlling the parameters of the first, second and third fluids 130, 132, 134.

In examples, the phase separation of the dispersed phase (the first fluid 130 with dispersed third fluid 134) and the continuous phase (the second fluid 132) of the emulsion will further depend on instabilities generated by the application of the electric field and by the pH difference between the second fluid 132 and the third fluid 134, which can break the droplet. For example, the third fluid may have a pH greater or larger than a pH of the second fluid. For example, the second fluid may have a pH of around 7 to 8 and the third fluid may have a pH of around 12 to 14. In such examples, the first fluid may have a pH of around 6. The third fluid having a relatively high pH helps retain a stable spherical shape of the droplet of the third fluid within the first fluid in examples. For example, a sphericity of the droplet of the third fluid may increase with increasing pH of the third fluid. With the pH of the third fluid being larger than the pH of the second fluid by more than about more than about 2 or 3, the first fluid comprising the third fluid may be relatively stable. In contrast, with a pH difference of less than this, the first fluid comprising the third fluid may be more deformable and may therefore break more easily upon the application of a voltage. Accordingly, a pH difference between the second and third fluids may be chosen in dependence on a voltage to be applied to cause the forming of the layer of the first fluid, for example by coalescence of the first fluid.

In examples, the third fluid has an electrical conductivity greater than an electrical conductivity of the second fluid. For example, the second fluid may have a conductivity of around 0.1 micro Siemens per centimeter (μS/cm) and the third fluid may have a conductivity of between around 10 to 100 micro Siemens per centimeter (μS/cm). This can assist in moving the droplet of the first fluid 130 containing charged third fluid 134 through the second fluid 132 towards the surface 14 of the first support plate 5.

Further examples relate to an apparatus for manufacturing an electrowetting device. In examples, the apparatus comprises a dispenser configured to dispense a first fluid, a dispenser configured to dispense a third fluid in the first fluid, the third fluid immiscible with the first fluid, and a dispenser configured to dispense a second fluid immiscible with the first fluid to form an emulsion comprising the first fluid dispersed in the second fluid and, dispersed within the first fluid, the third fluid. The apparatus in examples further comprises a support plate holder configured to hold a support plate for an electrowetting device and a dispenser configured to dispense the emulsion on a surface of the support plate.

The apparatus according to such examples may be as shown in FIG. 5. The dispenser 68 for dispensing the third fluid 34 may for example be a source of the third fluid 34 located at the first inlet 36, which provides the third fluid 34 to the first channel 37 such that it is incident on the first fluid 30. For example, the dispenser may be arranged to pump or dose the third fluid 34 at the appropriate rate through the system of FIG. 5 such that it meets, and is dispersed in, the first fluid 30. The dispenser may be for example a syringe mechanism, a nozzle or an outlet, which in examples may be fluidly connected to a fluid pump, for dispensing the desired amount of third fluid 34 in the first channel 37, via the first inlet 36. In other examples the dispenser 68 for dispensing the third fluid 34 may be a pipe, tube, channel or conduit through which the third fluid 34 can flow to meet the first fluid 30. The dispenser 70a, 70b of the first fluid 30 may be similar to the dispenser of the third fluid 34 but configured to provide the first fluid 30 in the second and third channels 42, 44, via the second and third inlets 38, 40. The dispenser 72a, 72b of the second fluid 12 may also be similar to the dispenser of the third fluid 34 but configured to provide the second fluid 12 in the fourth and fifth channels 54, 56, via the fourth and fifth inlets 50, 52 such that the second fluid 12 meets and forms an emulsion with the first fluid 30 with the third fluid 34 dispersed in it. The dispenser for dispensing the emulsion on the surface of the support plate is for example a pipe, tube, channel or conduit, such as the second wide channel 60 in the example of FIG. 5, which may include a pump and/or valve for controlling the flow of the emulsion, for directing the emulsion towards and onto the surface of the support plate in a desired quantity and at a desired rate. In other examples, the apparatus may comprise a combined dispenser for dispensing the emulsion. In other words, the emulsion may be made prior to dispensing and then dispensed from one dispenser to the surface of the first support plate.

In further examples, the apparatus comprises an electrical charging system configured to electrically charge the third fluid before dispensing the third fluid in the first fluid. The electrical charging system may include a first electrode for electrically connecting to the third fluid and a second electrode for electrically connecting to the first fluid, with the third fluid dispersed in the first fluid, and may be configured to apply a potential difference between the first electrode and the second electrode. For example, the electrical charging system may include the first and second electrodes 64, 66 of FIG. 6, although other charging systems are possible. The electrical charging system in examples is configured to apply a substantially zero voltage (for example a zero voltage within acceptable tolerances) to the first electrode and a substantially non-zero voltage to the second electrode, as described above in the example of FIG. 6. For example, the electrical charging system may be configured to apply a voltage with a magnitude of less than 0.5 volts (V) to the first electrode, for example a voltage of 0V, 0.1V, 0.2V, 0.3V or 0.4V, and a voltage with a magnitude which is equal to or larger than 0.5V to the second electrode.

In examples, the apparatus comprises an electric field application system comprising a first electrode for electrically connecting to the second fluid of the emulsion dispensed on the surface of the support plate, a second electrode for electrically connecting to an electrode in the support plate, and an electric field generator configured to apply an electric field between the first electrode and the second electrode. The electric field application system may be as described above, and may include the first and second electrodes 17 and 19 of the first and second support plates 5, 6. In other examples, the electric field application system may be external to the electrowetting element and may be used to apply an electric field across the electrowetting element.

The above examples are to be understood as illustrative examples. Further examples are envisaged.

In examples, the emulsion may comprise a surfactant to aid its stability and to avoid forming a layer of the first fluid, for example due to coalescence, before the emulsion has been dispensed onto the surface of the first support plate.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of manufacturing an electrowetting device, the method comprising:
    dispensing an emulsion on a surface of a first support plate, the first support plate comprising an electrode, the emulsion comprising:
        a first fluid dispersed in a second fluid immiscible with the first fluid, and,
        dispersed within the first fluid, a third fluid immiscible with the first fluid; and
    coalescing the first fluid to form a layer of the first fluid on the surface of the first support plate.

2. The method according to claim 1, wherein the surface comprises a first area more wettable to the first fluid than at least one of the second fluid or the third fluid.

3. The method according to claim 1, comprising:
    bringing the first fluid into contact with the surface of the first support plate to initiate the coalescing the first fluid.

4. The method according to claim 1, wherein the third fluid is electrically charged, the method further comprising:
    before the coalescing the first fluid, applying an electric field between the electrode and the second fluid to move the first fluid, with the third fluid dispersed within the first fluid, towards the surface of the first support plate.

5. The method according to claim 1, wherein the third fluid is at least one of electrically conductive or polar, the method further comprising:
    electrically charging the third fluid, before the dispensing the emulsion on the surface of the first support plate.

6. The method according to claim 1, comprising:
    dispensing, before the dispensing the emulsion on the surface of the first support plate, a stream of the third fluid into a stream of the first fluid to disperse the third fluid in the first fluid.

7. The method according to claim 1, comprising:
    dispensing a first stream of the first fluid;
    dispensing a second stream of the first fluid towards the first stream of the first fluid; and
    dispensing a stream of the third fluid into the first fluid in a region where the first stream of the first fluid meets the second stream of the first fluid.

8. The method according to claim 7, wherein the third fluid is at least one of electrically conductive or polar, the method further comprising:
    applying a potential difference across the region where the first stream of the first fluid meets the second stream of the first fluid, to electrically charge the third fluid.

9. The method according to claim 1, comprising:
    dispensing a first stream of the first fluid in a first direction;
    dispensing a second stream of the first fluid towards the first stream of the first fluid in a second direction substantially opposing the first direction; and
    dispensing a stream of the third fluid into the first fluid in a region where the first stream of the first fluid meets the second stream of the first fluid, in a direction substantially perpendicular to each of the first direction and the second direction.

10. The method according to claim 1, comprising:
    forming the emulsion by dispensing a stream of the first fluid, with the third fluid dispersed in the first fluid, into a stream of the second fluid to disperse the first fluid in the second fluid.

11. The method according to claim 1, comprising:
    dispensing a first stream of the second fluid;
    dispensing a second stream of the second fluid towards the first stream of the second fluid; and
    forming the emulsion by dispensing a stream of the first fluid, with the third fluid dispersed in the first fluid, into the second fluid in a region where the first stream of the second fluid meets the second stream of the second fluid.

12. The method according to claim 1, comprising:
    dispensing a first stream of the second fluid in a third direction;
    dispensing a second stream of the second fluid towards the first stream of the second fluid in a fourth direction substantially opposing the third direction; and
    forming the emulsion by dispensing a stream of the first fluid, with the third fluid dispersed in the first fluid, into the second fluid in a region where the first stream of the second fluid meets the second stream of the second fluid, in a direction substantially perpendicular to each of the third direction and the fourth direction.

13. The method according to claim 1, wherein the third fluid has an electrical conductivity greater than an electrical conductivity of the second fluid.

14. The method according to claim 1, wherein the third fluid has a pH greater than a pH of the second fluid.

15. The method according to claim 1, wherein the first fluid is electrically non-conductive, the second fluid is at least one of electrically conductive or polar, and the third fluid is at least one of electrically conductive or polar.

16. The method according to claim 1, comprising:
bringing the first fluid into contact with a first area of the surface of the first support plate to initiate the coalescing the first fluid,
the first area having a higher wettability for the first fluid than for at least one of the second fluid or the third fluid.

17. The method according to claim 16, wherein a second area of the surface of the first support plate has a higher wettability for at least one of the second fluid or the third fluid than for the first fluid, the method further comprising:
displacing the first fluid from the second area of the surface of the first support plate with at least one of the second fluid or the third fluid.

18. The method according to claim 1, comprising:
mixing the second fluid and the third fluid to form, on the layer of the first fluid, a second layer comprising the second fluid and the third fluid.

19. The method according to claim 18, comprising:
applying a second support plate on a surface of the second layer, the second layer located between the second support plate and the layer of the first fluid.

20. The method according to claim 1, wherein the emulsion is a double emulsion comprising:
a first emulsion of the first fluid and the third fluid; and
a second emulsion of the second fluid and the first emulsion.

21. The method according to claim 1, wherein a first composition of the second fluid is substantially the same as a second composition of the third fluid.

22. The method according to claim 1, wherein the third fluid comprises a salt dissolved in a solvent with a concentration in the range of around 0.25 grams per liter of the third fluid to around 2.25 grams per liter of the third fluid.

23. The method according to claim 22, wherein the salt is potassium chloride.

24. The method according to claim 1, wherein the emulsion comprises a surfactant.

25. The method according to claim 1, wherein the first support plate comprises a wall and a thickness of the layer of the first fluid is substantially equal to a height of the wall.

* * * * *